US009067832B2

(12) United States Patent
Iwata et al.

(10) Patent No.: US 9,067,832 B2
(45) Date of Patent: *Jun. 30, 2015

(54) INORGANIC FIBROUS MOLDED REFRACTORY ARTICLE, METHOD FOR PRODUCING INORGANIC FIBROUS MOLDED REFRACTORY ARTICLE, AND INORGANIC FIBROUS UNSHAPED REFRACTORY COMPOSITION

(75) Inventors: Koji Iwata, Tokyo (JP); Ken Yonaiyama, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 235 days.

This patent is subject to a terminal disclaimer.

(21) Appl. No.: 13/520,938

(22) PCT Filed: Dec. 24, 2010

(86) PCT No.: PCT/JP2010/073273
§ 371 (c)(1),
(2), (4) Date: May 6, 2013

(87) PCT Pub. No.: WO2011/083696
PCT Pub. Date: Jul. 14, 2011

(65) Prior Publication Data
US 2013/0225391 A1    Aug. 29, 2013

(30) Foreign Application Priority Data
Jan. 7, 2010   (JP) .................................. 2010-001938

(51) Int. Cl.
| C04B 35/22 | (2006.01) |
| C04B 35/622 | (2006.01) |
| C04B 35/00 | (2006.01) |
| B22D 35/00 | (2006.01) |
| B22D 41/02 | (2006.01) |
| B22D 45/00 | (2006.01) |
| C04B 26/04 | (2006.01) |
| C04B 26/28 | (2006.01) |
| C04B 28/24 | (2006.01) |
| C04B 35/626 | (2006.01) |
| C04B 35/63 | (2006.01) |
| C04B 35/634 | (2006.01) |
| C04B 35/636 | (2006.01) |
| C04B 35/80 | (2006.01) |
| C04B 35/82 | (2006.01) |

(Continued)

(52) U.S. Cl.
CPC ............... *C04B 35/22* (2013.01); *B22D 35/00* (2013.01); *B22D 41/02* (2013.01); *B22D 45/00* (2013.01); *C04B 26/04* (2013.01); *C04B 26/28* (2013.01); *C04B 28/24* (2013.01); *C04B 35/6263* (2013.01); *C04B 35/6303* (2013.01); *C04B 35/6316* (2013.01); *C04B 35/63424*
(2013.01); *C04B 35/63444* (2013.01); *C04B 35/636* (2013.01); *C04B 35/803* (2013.01); *C04B 35/82* (2013.01); *C04B 2111/00431* (2013.01); *C04B 2111/28* (2013.01); *C04B 2235/3218* (2013.01); *C04B 2235/3232* (2013.01); *C04B 2235/3244* (2013.01); *C04B 2235/3418* (2013.01); *C04B 2235/3445* (2013.01); *C04B 2235/3454* (2013.01); *C04B 2235/3481* (2013.01); *C04B 2235/5232* (2013.01); *C04B 2235/526* (2013.01); *C04B 2235/5264* (2013.01); *C04B 2235/5276* (2013.01); *C04B 2235/5296* (2013.01); *C04B 2235/5427* (2013.01); *C04B 2235/5436* (2013.01); *C04B 2235/606* (2013.01); *C04B 2235/6567* (2013.01); *C04B 2235/77* (2013.01); *C04B 2235/96* (2013.01); *C04B 2235/9615* (2013.01); *F27D 1/0006* (2013.01); *F27D 1/0009* (2013.01); *C04B 35/66* (2013.01); *C04B 2235/5228* (2013.01); *C04B 2235/349* (2013.01)

(58) Field of Classification Search
CPC ........ C04B 35/22; C04B 35/622; C04B 35/00
USPC ........................................ 501/95.1, 95.2, 95.3
See application file for complete search history.

(56) References Cited

U.S. PATENT DOCUMENTS 4,873,209 A    10/1989   Gnyra
5,073,199 A *  12/1991   Krowl et al. ................... 106/797
(Continued)

FOREIGN PATENT DOCUMENTS

| JP | 2001-192278 | 7/2001 |
| JP | 2003-55888 | 2/2003 |

(Continued)

OTHER PUBLICATIONS

Machine translation of JP 2001-192278 A, Jul. 17, 2001.*

*Primary Examiner* — Anthony J Green
*Assistant Examiner* — Elizabeth A Bolden
(74) *Attorney, Agent, or Firm* — Steptoe & Johnson LLP

(57) ABSTRACT

To provide a highly bio-soluble fibrous shaped refractory article which can develop desired heat resistance without containing ceramic fibers such as aluminum silicate fibers, alumina powder and silica powder and can be provided at a low production cost and a low product cost. An inorganic fibrous shaped refractory article comprising 2 to 95 mass % of bio-soluble inorganic fibers having a dissolution ratio in a physiological saline at 40° C. of 1 mass % or more, 2 to 95 mass % of inorganic powder having a needle-like crystal structure and 3 to 32 mass % of a binder, and in particular, it is an inorganic fibrous refractory article wherein the inorganic powder having the needle-like crystal structure has an average length of 1 to 3000 μm and an aspect ratio of 1 to 1000.

10 Claims, No Drawings

(51) Int. Cl.
   *F27D 1/00*  (2006.01)
   *C04B 35/66*  (2006.01)
   *C04B 111/00*  (2006.01)
   *C04B 111/28*  (2006.01)

(56) References Cited

U.S. PATENT DOCUMENTS

| | | | | |
|---|---|---|---|---|
| 5,362,690 | A | * | 11/1994 | Delvaux et al. ............. 501/95.1 |
| 6,043,172 | A | * | 3/2000 | Hart ............................ 501/95.1 |
| 6,287,994 | B1 | * | 9/2001 | Hart ............................... 501/12 |
| 6,987,076 | B1 | | 1/2006 | Jubb |
| 2009/0156386 | A1 | * | 6/2009 | Freeman et al. ............ 501/95.1 |

FOREIGN PATENT DOCUMENTS

| | | |
|---|---|---|
| JP | 2003-287374 | 10/2003 |
| JP | 2008-162853 | 7/2008 |
| JP | 2008-247720 | 10/2008 |
| WO | WO 87/05007 | 8/1987 |
| WO | 0015574 A † | 3/2000 |
| WO | WO 00/15574 | 3/2000 |

\* cited by examiner
† cited by third party

INORGANIC FIBROUS MOLDED REFRACTORY ARTICLE, METHOD FOR PRODUCING INORGANIC FIBROUS MOLDED REFRACTORY ARTICLE, AND INORGANIC FIBROUS UNSHAPED REFRACTORY COMPOSITION

TECHNICAL FIELD

The invention relates to an inorganic fibrous shaped refractory article, a method for producing an inorganic fibrous shaped refractory article and an inorganic fibrous unshaped refractory composition.

BACKGROUND ART

Conventionally, in an industrial furnace, a firing furnace, a heat-treatment apparatus or the like, as a lining material or a heat-insulating material for a ceiling, a wall or the like inside of a heating chamber, a relatively heavy refractory material such as brick has been used. In recent years, an inorganic fibrous shaped refractory article formed mainly of inorganic fibers has come to be used (see Patent Document 1 (JP-A-2001-192278), for example).

An inorganic fibrous shaped refractory article contains inorganic fibers, a binder for binding the inorganic fibers, and an inorganic filler which is optionally added. As the above-mentioned inorganic fibers, in order to improve the heat resistance as well as to reduce the density of the shaped article, ceramic fibers such as alumina silicate fibers have been used. As the above-mentioned inorganic filler, alumina powder or silica powder has been used in order to improve heat resistance.

However, since the inorganic fillers such as alumina powder or silica powder are expensive, there is a technical problem that the production cost and the product price of the inorganic fibrous shaped article are increased.

In the inorganic fibrous shaped article as mentioned above, some ceramic fibers or silica powder used have a high chemical resistance for a body fluid, and hence, possibility has been pointed out that they may adversely affect the health of a human body when they invade the lung by breathing.

Further, in an apparatus for casting aluminum, magnesium or the like, when a plurality of the above-mentioned inorganic fibrous shaped articles are combined to be used as a lining material of a member which contacts a molten metal, such as a drainpipe, a molten metal holding furnace and a ladel, a paste-like inorganic fibrous unshaped refractory composition is used in spaces between the combined articles (joint) or the like. Since this paste-like inorganic fibrous unshaped refractory composition is obtained by adding a liquid solvent to the same materials as those of the inorganic fibrous shaped refractory article, there is also a technical problem that the production cost and the product price are increased.

RELATED ART DOCUMENTS

Patent Document

Patent Document 1: JP-A-2001-192278

SUMMARY OF THE INVENTION

Subject to be Solved by the Invention

Under such circumstances, the invention is aimed at providing an inorganic fibrous shaped refractory article having a high bio-solubility which can exhibit high heat resistance and can be produced at a low cost and can be provided at a low price without using alumina powder or silica powder as the inorganic filler, as well as to provide a method for producing the inorganic fibrous shaped refractory article easily. Further, the invention is aimed at providing an inorganic fibrous unshaped refractory composition which can exhibit high heat resistance and can be produced at a low cost and provided at a low price without using ceramic fibers as the inorganic fibers or without using alumina powder or silica powder as the inorganic filler.

Means for Solving the Subject

In order to attain the above-mentioned object, the inventors made intensive studies. As a result, the inventors have found that the above-mentioned object can be attained by producing an inorganic fibrous shaped refractory article or an inorganic fibrous unshaped refractory composition by using materials comprising 2 to 95 mass % of bio-soluble inorganic fibers which has a solubility in a physiological saline at 40° C. of 1 mass % or more, 2 to 95 mass % of inorganic powder having a needle-like crystal structure, and 3 to 32 mass % of a binder. The invention has been made based on this finding.

That is, the invention provides:

(1) An inorganic fibrous shaped refractory article comprising 2 to 95 mass % of bio-soluble inorganic fibers having a dissolution ratio in a physiological saline at 40° C. of 1 mass % or more, 2 to 95 mass % of inorganic powder having a needle-like crystal structure and 3 to 32 mass % of a binder.

(2) The inorganic fibrous shaped refractory article according to claim 1, wherein the inorganic powder having a needle-like crystal structure has an average length of 1 to 3000 μm and an aspect ratio of 1 to 1000.

(3) A method for producing an inorganic fibrous shaped refractory article, the method comprising subjecting a slurry comprising 2 to 95 mass % of bio-soluble inorganic fibers having a dissolution ratio in a physiological saline at 40° C. of 1 mass % or more, 2 to 95 mass % of inorganic powder having a needle-like crystal structure and 3 to 32 mass % of a binder, in terms of solid matters, to dehydration shaping.

(4) An inorganic fibrous unshaped refractory composition comprising 2 to 95 mass % of bio-soluble inorganic fibers having a dissolution ratio in a physiological saline at 40° C. of 1 mass % or more, 2 to 95 mass % of inorganic powder having a needle-like crystal structure and 3 to 32 mass % of a binder, in terms of solid matters.

Advantageous Effects of the Invention

According to the invention, by containing a specific amount of bio-soluble inorganic fibers and a specific amount of inorganic powder having a needle-like crystal structure, it is possible to provide a highly bio-soluble inorganic fibrous refractory shaped article which can exhibit desired heat resistance and can be provided at a low cost and at a low price without containing alumina powder and silica powder. Further, according to the invention, it is possible to provide a method for producing the above-mentioned inorganic fibrous shaped refractory article easily. According to the invention, it is possible to provide an inorganic fibrous unshaped refractory composition which can be provided at a low cost and at a low price.

Mode for Carrying out the Invention (Inorganic Fibrous Shaped Refractory Article)

First, the inorganic fibrous shaped refractory article of the invention will be explained.

The inorganic fibrous refractory article of the invention is formed from materials comprising 2 to 95 mass % of the bio-soluble inorganic fibers having a solubility in a physiological saline at 40° C. of 1% or more, 2 to 95 mass % of inorganic powder having a needle-like crystal structure and 3 to 32 mass % of a binder.

The inorganic fibrous refractory article of the invention comprises bio-soluble inorganic fibers having a solubility in a physiological saline at 40° C. of 1% or more. As examples of such bio-soluble inorganic fibers, one having a shrinkage in the longitudinal direction of 1% or less when subjecting to a heat treatment at 800° C. for 24 hours in the atmosphere of air ({length before heating−length after heating)/length before heating})×100) and a shrinkage in the longitudinal direction of 5% or less when subjecting to a heat treatment at 1100° C. for 24 hours in the atmosphere of air can be given.

As examples of the above-mentioned bio-soluble inorganic fibers, one or more selected from alkaline-earth metal silicate fibers in which the total amount of CaO and MgO is 20 to 40 wt % and comprises 60 to 80 wt % of $SiO_2$ can be given, for example. Specific examples include inorganic fibers disclosed in JP-A-2000-220037, JP-A-2002-68777, JP-A-2003-73926 or JP-A-2003-212596, i.e. inorganic fibers in which the total amount of $SiO_2$ and CaO is 85 mass % or more and comprise 0.5 to 3.0 mass % of MgO and 2.0 to 8.0 mass % of $P_2O_5$ and has a carcinogenic index (KI value) according to the German Regulations for Hazardous Materials of 40 or more; inorganic fibers containing $SiO_2$, MgO and $TiO_2$ as essential components; inorganic fibers containing $SiO_2$, MgO and manganese oxide as essential components; inorganic fibers containing 52 to 72 mass % of $SiO_2$, less than 3 mass % of $Al_2O_3$, 0 to 7 mass % of MgO, 7.2 to 95 mass % of CaO, 0 to 12 mass % of $B_2O_3$, 0 to 4 mass % of BaO, 0 to 3.5 mass % of SrO, 10 to 20.5 mass % of $Na_2O$, 0.5 to 4.0 mass % of $K_2O$ and 0 to 5 mass % of $P_2O_5$, and inorganic fibers comprising 75 to 80 mass % of $SiO_2$, 19 to 25 mass % of CaO+MgO and 1 to 3 mass % of $Al_2O_3$.

Due to the dissolution ratio in a physiological saline at 40° C. of 1 mass % or more, the bio-soluble inorganic fibers are tend to be solved easily in a living body. On the other hand, if the dissolution ratio in a physiological saline is less than 1 mass %, the bio-soluble inorganic fibers can be hardly dissolved in a living body.

As for the method for measuring the solubility of the bio-soluble inorganic fibers in a physiological saline, an explanation will be made as follows taking as an example the case in which silicon, magnesium, calcium and aluminum are considered as the metal elements constituting bio-soluble inorganic fibers.

1g of a sample obtained by pulverizing bio-soluble inorganic fibers to 200 meshes or less and 150 mL of a physiological saline are placed in a conical flask (300 mL), and the flask is then installed in an incubator at 40° C. The conical flask is subjected to horizontal shaking at 120 rpm continuously for 50 hours. After the completion of the shaking, the liquid is filtered. As for silicon, magnesium, calcium and aluminum contained in the resulting filtrate, the concentration of each element (mg/L) is measured by the Inductively Coupled Plasma Emission Spectroscopy.

From the concentration of each element in the above-mentioned filtrate and the content (mass %) of each element in the bio-soluble inorganic fibers before dissolution, the dissolution ratio C (%) in a physiological saline at 40° C. is calculated according to the following formula (1). The concentration of each element obtained by the Inductively Coupled Plasma Emission Spectroscopy is taken as follows: the concentration of silicon: A1 (mg/L), the concentration of magnesium: a2 (mg/L), the concentration of calcium: a3 (mg/L) and the concentration of aluminum: a4 (mg/L). The content of each element in the inorganic fibers before dissolution is taken as follows: the content of silicon: b1 (mass %), the content of magnesium: b2 (mass %), the content of calcium: b3 (mass %) and the content of aluminum: b4 (mass %).

$$C(\%)=\{\text{filtrate }(L)\times(a1+a2+a3+a4)\times100\}/\{\text{amount (mg) of inorganic fibers before dissolution}\times(b1+b2+b3+b4)/100\} \quad (1)$$

In the inorganic fibrous shaped refractory shaped article of the invention, the bio-soluble inorganic fibers serve as an aggregate.

The average fiber diameter of the bio-soluble inorganic fibers is preferably 1 to 50 μm, more preferably 1 to 10 μm, with 1 to 6 μm being further preferable. If the average fiber diameter is less than 1 μm, the moisture resistance tends to be lowered, whereby the strength of the resulting refractory shaped article is lowered. If the average fiber diameter exceeds 50 μm, the density of the refractory shaped article is decreased, whereby the strength of the resulting refractory shaped article tends to be lowered. Further, the average fiber length is preferably 1 to 200 mm, more preferably 1 to 100 mm, with 1 to 50 mm being further preferable. If the average fiber length is within the above-mentioned range, a refractory shaped article having an appropriate density can be obtained easily.

In this specification, the average fiber diameter and the average fiber length each mean the average value of the length and the diameter of 300 to 500 inorganic fibers as the sample to be measured which are measured by means of an optical microscope.

The constituent materials of the inorganic fibrous refractory article of the invention comprise 2 to 95 mass % of the bio-soluble inorganic fibers having a solubility in a physiological saline at 40° C. of 1% or more. The content of the bio-soluble inorganic fibers in the above-mentioned constituent materials is suitably 18 to 72 mass %, more suitably 27 to 63 mass %.

Since the inorganic fibrous shaped refractory article of the invention is formed from materials which comprise 2 to 95 mass % of bio-soluble inorganic fibers, it can exhibit intended heat resistance due to the interaction of the bio-soluble inorganic fibers and the inorganic powder having a needle-like crystal structure, and at the same time, it can exhibit high bio-solubility.

The constituent materials of the inorganic fibrous shaped refractory article of the invention contain inorganic powder having a needle-like crystal structure.

As the inorganic powder having a needle-like crystal structure, a natural mineral or a synthetic material can be given. Specific examples thereof include one or more selected from wollastonite powder, sepiolite powder and attapulgite powder.

Wollastonite is an inorganic substance of which the crystal structure is in the form of a needle, which is represented by $CaSiO_3(CaO\cdot SiO_2)$ and has an endless silicon-oxygen chain $(SiO_3)$ structure which is bonded by calcium cation. The wollastonite as a natural mineral is produced in a limestone area as tabular spar. It may contain a slight amount (less than 0.5 wt %, for example) of $Al_2O_3$ or $Fe_2O_3$ as impurities.

Sepiolite is a clay-like hydrated magnesium silicate mineral, and is an inorganic substance of which the crystal structure is in the form of a needle represented by a composition formula $Mg_4Si_6O_{15}(OH)_2\cdot 6H_2O$. Attapulgite is a clay-like hydrated aluminum silicate magnesium compound, and is an inorganic substance of which the crystal structure is in the form of a needle represented by a composition formula $Si_8O_{20}Mg_5(OH)_2 \cdot Al(OH)_4 \cdot 4H_2O$.

In the inorganic fibrous shaped refractory article of the invention, as the inorganic powder having a needle-like crystal structure, one having an average length of 1 to 3000 μm is preferable, one having an average length of 2 to 2000 μm is more preferable, and one having an average length of 3 to 1000 μm is further preferable. As the inorganic powder having a needle-like crystal structure, one having an average diameter of 1 to 100 μm is preferable. One having an average diameter of 1 to 90 μm is more preferable, and one having an average diameter of 1 to 80 μm is further preferable.

As the inorganic powder having a needle-like crystal structure, one having an aspect ratio of 1 to 1000 is preferable, one having an aspect ratio of 2 to 100 is more preferable, and one having an aspect ratio of 3 to 50 is further preferable.

The average length and the average diameter of the inorganic powder having a needle-like crystal structure each mean the average values of the length and the diameter of 300 to 500 inorganic particles (powder) as the sample which are measured by means of an optical microscope.

The aspect ratio of the inorganic powder having a needle-like crystal structure can be obtained by dividing the average length of the inorganic powder by the average diameter of the inorganic powder.

The constituent materials of the inorganic fibrous shaped refractory article of the invention comprise 2 to 95 mass % of the inorganic powder having a needle-like crystal structure, suitably 18 to 72 mass %, and more suitably 27 to 63 mass %.

Since the inorganic fibrous shaped refractory article of the invention is formed from materials which comprise 2 to 95 mass % of the inorganic powder having a needle-like crystal structure, a desired heat resistance is exhibited due to the interaction with bio-soluble inorganic fibers, the production cost and the product price are decreased, and excellent bio-solubility can be exhibited.

For the materials constituting the inorganic fibrous shaped refractory article of the invention, as the inorganic powder having a needle-like crystal structure, wollastonite having a melting point of 1500° C. or sepiolite having a melting point of 1550° C. or the like is used. Since these inorganic powder have a lower melting point than those of alumina (α-alumina: melting point 2053° C.) or silica (melting point 1650° C.), they were conventionally thought to be unsuitable as the material constituting a refractory shaped article.

However, as a result of intensive studies, the inventors have found that, by using constituting materials comprising a specific amount of inorganic powder such as wollastonite which has a low melting point and hence was thought to have little effects of improving the heat resistance and a specific amount of bio-soluble inorganic fibers, the resulting inorganic fibrous shaped refractory article can exhibit excellent heat resistance due to the interaction of the inorganic powder having a needle-like crystal structure and bio-soluble fibers. The invention has been made based on this finding.

The inorganic powder having a needle-like crystal structure such as wollastonite is more inexpensive as compared with alumina powder or the like, is easily available and is bio-soluble, and hence, it can reduce the production cost and the product price of the inorganic fibrous shaped refractory article, and at the same time, is capable of improving the bio-solubility of the inorganic fibrous shaped refractory article.

The materials constituting the inorganic fibrous shaped refractory article of the invention comprise 3 to 32 mass %, preferably 5.5 to 22 mass %, of a binder. It is more preferred that the materials comprise 7 to 18 mass % of a binder.

In the inorganic fibrous shaped refractory article of the invention, as the binder, one or more binders selected from an inorganic binder and an organic binder can be given. If a plurality of binders is used, the above-mentioned content of the binder means the total amount of binders used.

As the inorganic binder, one or more selected from colloidal silica such as anionic colloidal silica and cationic colloidal silica, fumed silica, alumina sol, zirconia sol and titania sol can be given.

As mentioned later, by conducting a firing treatment at high temperatures during the production or use of the refractory shaped article, the above-mentioned inorganic binder takes the form of an oxide such as silica or alumina. In this specification, an inorganic binder in any form before and after the above-mentioned firing treatment is referred to as the "inorganic binder". Further, in this specification, the amount ratio of the inorganic binder is a value when the binder is converted into an oxide.

It is preferred that the materials constituting the inorganic fibrous shaped refractory article of the invention contain 3 to 20 mass %, more preferably 3.5 to 15 mass %, further preferably 4 to 12 mass % of an inorganic binder in terms of oxides.

In the materials constituting the inorganic fibrous shaped refractory article of the invention, if the content of the inorganic binder is less than 3 mass %, it is difficult to obtain an effect of improving the strength when used under high temperatures. If the content of the inorganic binder exceeds 20 mass %, the water-filtration performance during the dehydration shaping step is lowered in the production of the refractory shaped article, as mentioned later, and as a result, the production efficiency is lowered.

As mentioned later, an inorganic binder such as colloidal silica enables bio-soluble inorganic fibers to be firmly bonded together by firing the inorganic binder with bio-soluble inorganic fibers at a temperature of about 600 to 1000° C. Therefore, after drying a preliminary shaped article obtained by subjecting the raw material to dehydration shaping, by subjecting it to a firing treatment or by firing together with an object to be treated in an industrial furnace or the like, it can exhibit high performance as a binder.

As the organic binder, starch, an acrylic resin, polyacrylamide or the like can be given.

It is preferred that the materials constituting the inorganic fibrous shaped refractory article of the invention contain 0.1 to 12 mass %, more preferably 2 to 7 mass % and further preferably 3 to 6 mass % of an organic binder.

In the inorganic fibrous shaped refractory article of the invention, if the amount ratio of the organic binder is less than 0.1 mass %, when a preliminary shaped article is subjected to a drying treatment in the production of a refractory shaped article, which is described later, the dried article may not have a sufficient strength. If the amount ratio of the organic binder exceeds 12 mass %, when a dried article is fired, the amount of an exhausted combustion gas may be increased or the inorganic fibrous shaped refractory article may absorb moisture during storage, thereby to deteriorate the properties thereof.

Due to the presence of an organic binder in the inorganic fibrous shaped refractory article of the invention, as mentioned later, at the time of producing the inorganic fibrous shaped refractory article, a refractory shaped article obtained by subjecting a raw material to dehydration shaping and drying can have a sufficient shape-retaining property and strength.

The materials constituting the inorganic fibrous shaped refractory article of the invention contain the bio-soluble inorganic fibers, the inorganic powder having a needle-like crystal structure and the binder as mentioned above in a total amount of preferably 50 mass % or more, more preferably 70 mass % or more, and further preferably 90 mass % or more.

Due to the presence of the bio-soluble inorganic fibers, the inorganic powder having a needle-like crystal structure and the binder in a total amount of 50 mass % or more, heat resistance of the inorganic fibrous shaped refractory article of the invention can be improved more effectively.

The materials constituting the inorganic fibrous shaped refractory article of the invention may contain powdery filler or powdery aggregate according to need. Due to the presence of such filler or aggregate, mechanical strength of the inorganic fibrous shaped refractory article can be improved.

As the filler or the aggregate, a lightweight aggregate such as chamotte and ceramic balloon, inorganic powder such as alumina, silica, cordierite, diatomite, zircon, zirconia, magnesia and calcia, and a clay mineral such as kaolinite can be given.

The materials constituting the inorganic fibrous shaped refractory article of the invention may contain an appropriate amount of a dispersant such as sodium hexamethaphosphate, sodium tripolyphosphate and sodium ultrapolyphosphate, and a coagulant such as aluminum sulfate and polyacrylamide, if necessary.

The materials constituting the inorganic fibrous shaped refractory article of the invention may contain a filler or an aggregate in an amount of 1 to 30 mass %, a dispersant in an amount of 0.5 to 10 mass % and a coagulant in an amount of 0.5 to 10 mass %, if necessary.

Since the inorganic fibrous shaped refractory article of the invention, contains a specific amount of bio-soluble inorganic fibers and a specific amount of inorganic powder having a needle-like crystal structure, a desired heat resistance can be exhibited without containing ceramic fibers such as alumina silicate fiber, alumina powder and silica powder, and the production cost and the product price can be reduced.

The inorganic fibrous shaped refractory article of the invention preferably has a shrinkage in the longitudinal direction after a 24-hour heat treatment at 1100° C. in the air atmosphere ({length before heating–length after heating}/length before heating})×100) of preferably 5% or less, for example, more preferably 3.0% or less, with 1.0% or less being further preferable.

Since the inorganic fibrous shaped refractory article of the invention comprises a specific amount of inorganic bio-soluble inorganic fibers and a specific amount of inorganic powder having a needle-like crystal structure, excellent heat resistance can be exhibited.

The inorganic fibrous shaped refractory article of the invention has a bulk density of 0.1 to 1.0 g/cm$^3$, for example, preferably 0.15 to 0.7 g/cm$^3$, more preferably 0.17 to 0.35 g/cm$^3$.

The inorganic fibrous shaped refractory article of the invention has a bending strength of 0.1 to 2.0 MPa, for example, and preferably 0.2 to 1.5 MPa.

The inorganic fibrous shaped refractory article of the invention may be in the form of a cylinder, a bottomed cylinder, a flat plate, a block or the like, for example.

The inorganic fibrous shaped refractory article of the invention can be produced by subjecting a raw material to dehydration shaping in the method for producing the inorganic fibrous shaped refractory article mentioned later. In the invention, the inorganic fibrous shaped refractory article includes, in addition to one obtained by drying a preliminary shaped article which is obtained by dehydration shaping, one obtained by further subjecting the preliminary shaped article to a firing treatment. In the case of the inorganic fibrous shaped refractory article which is not subjected to a firing treatment after the dehydration shaping, it can become a fired product by arranging it at a desired position as a refractory material, and then heating with an object to be treated during use.

The inorganic fibrous shaped refractory article of the invention can be used preferably as a lining material or a heat-insulating material for the ceiling or walls or the like in the inside of a heating chamber of an industrial furnace, a firing furnace, a heat-treatment apparatus or the like.

(Method for Producing an Inorganic Fibrous Shaped Refractory Article)

Next, the method for producing an inorganic fibrous shaped refractory article of the invention will be explained.

The method for producing an inorganic fibrous shaped refractory article of the invention comprises subjecting a slurry comprising, in terms of solid matters, 2 to 95 mass % of bio-soluble inorganic fibers having a dissolution ratio in a physiological saline at 40° C. of 1 mass % or more, 2 to 95 mass % of inorganic powder having a needle-like crystal structure and 3 to 32 mass % of a binder to dehydration shaping.

In the method for producing the inorganic fibrous shaped refractory article of the invention, the bio-soluble inorganic fibers serve as the aggregate of the resulting refractory shaped article. As the example of the bio-soluble inorganic fibers, the same examples as those mentioned above can be given.

In the method for producing the inorganic fibrous shaped refractory article of the invention, the bio-soluble inorganic fibers are contained in a slurry in an amount of 2 to 95 mass %, preferably 18 to 72 mass %, and more preferably 27 to 63 mass %, in terms of solid matters.

In the method for producing the inorganic fibrous shaped refractory article of the invention, the inorganic powder having a needle-like crystal structure is a substance which is capable of improving the heat resistance of the resulting refractory article due to the interaction with the bio-soluble inorganic fibers in the article. As examples of the inorganic powder having a needle-like crystal structure, the same as those mentioned above can be given.

In the method for producing the inorganic fibrous shaped refractory article of the invention, it is preferred that the inorganic powder having a needle-like crystal structure be contained in the slurry in an amount of 2 to 95 mass %, preferably 18 to 72 mass %, more preferably 27 to 63 mass %, in terms of solid matters.

In the method for producing the inorganic fibrous shaped refractory article of the invention, the binder is contained in a slurry in an amount of 3 to 32 mass %, preferably 5.5 to 22 mass %, more preferably 7 to 18 mass %, in terms of solid matters.

In the method for producing the inorganic fibrous shaped article of the invention, as the binder, the organic binder or the inorganic binder as mentioned above can be given.

In the method for producing the inorganic fibrous shaped article of the invention, the inorganic binder is preferably contained in a slurry in an amount of 3 to 20 mass %, preferably 3.5 to 15 mass %, and more preferably 4 to 11 mass %, in terms of oxides.

If the content of the inorganic binder in the solid matters constituting the slurry is less than 3 mass % in terms of oxides, an oxide film may not be formed smoothly on the surface of the refractory shaped article. On the other hand, if the amount of the inorganic binder exceeds 20 mass %, the amount of water is increased, whereby the workability during the dehydration shaping is lowered.

In the method for producing the inorganic fibrous shaped refractory article of the invention, the organic binder is contained preferably in an amount of 0.1 to 12 mass %, more preferably in an amount of 2 to 7 mass %, and further preferably 3 to 6 mass % in solid matters.

If the amount ratio of the organic binder is less than 0.1 mass %, a dried product which is obtained by drying after the dehydration shaping may not have a sufficient strength. If the amount ratio of the organic binder exceeds 12 mass %, the amount of the combustion gas emitted when the dried shaped article is fired may be increased or the properties of the resulting refractory shaped article may be deteriorated due to the absorption of moisture during the storage.

In the method for producing the inorganic fibrous shaped refractory article of the invention, the slurry preferably contains the bio-soluble inorganic fibers, the inorganic powder having a needle-like crystal structure and the binder in a total amount of 50 mass % or more, more preferably 70 mass % or more, and further preferably 90 mass % or more in terms of solid matters.

In the method for producing the inorganic fibrous shaped refractory article of the invention, due to the presence of the bio-soluble inorganic fibers, the inorganic powder having a needle-like crystal structure and the binder in a total amount of 50 mass % or more in terms of solid matters in a slurry, the heat resistance, the bio-solubility or the like of the resulting refractory shaped article can be improved more effectively.

In the method for producing the inorganic fibrous shaped refractory article of the invention, the slurry may contain a filler, an aggregate, a dispersant or a coagulant in the form of powder according to need. As a result, the mechanical strength of the resulting inorganic fibrous shaped refractory article can be improved.

Specific examples or the amounts of the filler, the dispersant and the coagulant are the same as those mentioned above referring to the inorganic fibrous shaped refractory article. It is preferred that these components be mixed in the same amount in terms of solid matters as those mentioned above referring to the inorganic fibrous shaped refractory article.

Although no specific restrictions are imposed on the liquid solvent for forming a slurry in the method for producing the inorganic fibrous shaped refractory article of the invention, water and a polar organic solvent can be given. As the polar organic solvent, a monovalent alcohol such as ethanol and propanol and a divalent alcohol such as ethylene glycol can be given. Taking working environments or possible impacts on the environment into consideration, water is preferable. Although no specific restrictions are imposed on water, distilled water, ion exchange water, tap water, ground water, industrial water or the like can be given.

The solid matter content of the slurry is preferably 0.1 to 10 mass %, more preferably 0.3 to 8 mass %, and further preferably 0.5 to 3 mass %. If the above-mentioned slurry concentration is less than 0.1 mass %, the amount of water to be removed in the dehydration shaping step becomes inefficiently large. On the other hand, if the solid matter content of the slurry exceeds 10 mass %, the solid matters may hardly be dispersed uniformly in the slurry.

In the method for producing the inorganic fibrous shaped refractory article of the invention, the order of mixing raw materials such as the bio-soluble inorganic fibers, the inorganic powder having a needle-like crystal structure and the binder in a liquid medium at the time of forming a slurry is not particularly restricted. These materials may be mixed in a liquid medium sequentially or simultaneously.

In the method for producing the inorganic fibrous shaped refractory article of the invention, the above-mentioned slurry is subjected to a dehydration shaping treatment, whereby the liquid medium is removed.

In the method for producing the refractory shaped article of the invention, the slurry may contain other mediums than water as the liquid medium. In the invention, removing other liquid mediums than water is also referred to as the dehydration shaping.

Dehydration shaping can be conducted by absorption dehydration shaping in which, in a mold in which a net is provided at the bottom thereof, the above-mentioned slurry is poured, and dehydration shaping is conducted by absorbing water in the slurry, or by pressure dehydration shaping, for example.

In the method for producing the inorganic refractory shaped article of the invention, when conveying the slurry to a mold or the like, a pump or the like may be used, or the slurry may be conveyed by its own weight by arranging a mold under the chamber containing the above-mentioned slurry.

A suitable dehydrated product is one which has a shape approximate to a refractory shaped article to be obtained. As for the shape of a dehydrated product, a cylindrical shape, a bottomed cylindrical shape, a flat plate-like shape and a block-like shape can be given.

It is preferred that the resulting dehydrated product be dried by means of a drier or the like. The drying temperature is preferably 40 to 180° C., more preferably 60 to 150° C. and further preferably 80 to 120° C. The drying time is preferably 6 to 48 hours, more preferably 8 to 40 hours, with 10 to 36 hours being further preferable. Further, as for the atmosphere at the time of drying, air, oxygen, nitrogen or the like can be given.

In the method for producing the refractory shaped article of the invention, after subjecting the above-mentioned dehydrated shaped product to a drying treatment, it may further be subjected to a firing treatment.

It is preferred that the firing temperature be 600 to 1200° C., more preferably 700 to 1150° C., with 800 to 1100° C. being further preferable. Although no specific restrictions are imposed on the atmosphere at the time of firing, air, oxygen or nitrogen is preferable. The firing time is preferably 0.5 to 36 hours, more preferably 1 to 30 hours, with 3 to 24 hours being further preferable.

By removing the organic binder in the shaped article in advance by subjecting it to a firing treatment, it is possible to suppress the shrinkage of the shaped article, to decrease the amount of a generated gas such as $CO_2$ after being arranged providing on a heating furnace or the like, or to suppress joint opening between shaped articles, or generation of cracks or breakage of a shaped article itself.

The details of the resulting refractory shaped article are the same as those explained above referring to the refractory shaped article of the invention.

According to the method for producing the refractory shaped article of the invention, an inorganic fibrous shaped refractory article having a desired heat resistance and high bio-solubility can be produced easily at a low cost and at a low price without containing ceramic fibers such as alumina silicate fibers, alumina powder and silica powder.

(Inorganic Fibrous Unshaped Refractory Composition)

Next, the inorganic fibrous unshaped refractory composition of the invention will be explained.

The inorganic fibrous unshaped refractory composition of the invention comprises 2 to 95 mass % of bio-soluble inorganic fibers having a dissolution ratio in a physiological saline at 40° C. of 1 mass % or more, 2 to 95 mass % of inorganic powder having a needle-like crystal structure and 3 to 32 mass % of a binder in terms of solid matters.

In the inorganic fibrous unshaped refractory composition of the invention, as the bio-soluble inorganic fibers, the same as those mentioned above referring to the inorganic fibrous shaped refractory article can be given. As for the inorganic powder having a needle-like crystal structure or the binder, the same as those mentioned above referring to the inorganic fibrous shaped refractory article of the invention can be given.

It is preferred that the materials constituting the inorganic fibrous unshaped refractory article of the invention contain bio-soluble inorganic fibers in an amount of 2 to 95 mass %, preferably 10 to 90 mass %, and more preferably 20 to 80 mass % in solid matters.

Due to the presence of the bio-soluble inorganic fibers in an amount of 2 to 95 mass % in the solid matters, it is possible to provide an inorganic fibrous unshaped refractory composition which can impart a substance obtained by applying and drying the composition (hereinafter referred to as "resulting applied substance") (refractory substance) with heat-retaining (heat-insulating) properties and lightweightness while imparting the substance with the minimum required strength and corrosion resistance.

The materials constituting the inorganic fibrous unshaped refractory composition of the invention contain 2 to 95 mass %, suitably 10 to 90 mass %, more suitably 20 to 80 mass %, of the inorganic powder having a needle-like crystal structure in solid matters.

Due to the presence of the inorganic powder having a needle-like crystal structure in an amount of 2 to 95 mass %, a desired heat resistance is exhibited after applying due to the interaction with the inorganic powder having a needle-like crystal structure, and also the production cost or the product price can be reduced.

It is preferred that the materials constituting the inorganic fibrous unshaped refractory composition of the invention contain 3 to 32 mass %, preferably 3.5 to 22 mass % and more preferably 4 to 18 mass % of a binder in solid matters.

In the inorganic fibrous unshaped refractory composition of the invention, as the binder, one or more selected from an inorganic binder or an organic binder can be given. If a plurality of binders is used, the content of the above-mentioned binder means the total amount of the binders used.

It is preferred that the materials constituting the inorganic fibrous unshaped refractory composition of the invention contain, in solid matters, 3 to 20 mass %, more preferably 3 to 15 mass %, further preferably 3 to 12 mass % in terms of oxides of the inorganic binder. Further, the organic binder is contained preferably in an amount of 0.1 to 12 mass %, more preferably 0.5 to 7 mass %, and further preferably 1.0 to 6 mass %.

In the materials constituting the inorganic fibrous unshaped refractory composition of the invention, it is preferred that the bio-soluble inorganic fibers, the inorganic binder having a needle-like crystal structure and the binder be contained in a total amount of 50 mass % or more, more preferably 70 mass % or more and further preferably 90 mass % or more in solid matters.

In the materials constituting the inorganic fibrous unshaped refractory composition of the invention, due to the presence of the bio-soluble inorganic fibers, the inorganic powder having a needle-like crystal structure and the binder in a total amount of 50 mass % or more in solid matters, it is possible to impart the resulting applied substance (refractory substance) with a desired heat resistance effectively.

The materials constituting the inorganic fibrous unshaped refractory composition of the invention may contain, according to need, a powdery filler or aggregate as an optional component. Due to the presence of these materials, the mechanical strength of the inorganic fibrous shaped refractory article can be improved.

Specific examples of the filler or the aggregate are the same as those mentioned above as referring to the refractory shaped article of the invention. The amount of the filler or the aggregate in terms of solid matters is the same as those mentioned above referring to the refractory shaped article of the invention.

The unshaped refractory composition of the invention may contain an additive such as a pH adjustor, a thickener, a dispersant and an antiseptic.

As the pH adjustor, a buffer solution such as a phthalate standard solution (Sorensen's buffer solution) which is a pH 4 standard solution, a neutral phosphate pH standard equimolal solution which is a pH 7 standard solution or the like can be given. Specific examples of the acid include fruit acids such as acetic acid, malic acid and citric acid.

The content of the buffer solution or the acid is preferably an amount which allows the pH of the unshaped refractory composition to be 3 to 11.

As the thickener, hydroxyethyl cellulose, sodium polyacrylate, or the like can be given. As the dispersant, carboxylic acids, polyvalent alcohols, amines or the like can be given. As the antiseptic, an organic or inorganic compound containing a nitrogen atom or a sulfur atom can be given.

In the inorganic fibrous unshaped refractory composition of the invention, as for the unshaped composition, a paste-like composition obtained by mixing solid matters with a liquid solvent or the like can be given.

Although no specific restrictions are imposed on a liquid solvent forming a paste, water and a polar organic solvent can be given. Specific examples of the polar organic solvent include a monovalent alcohol such as ethanol and propanol and a divalent alcohol such as ethylene glycol. Of these liquid solvents, water is preferable in respect of working environments or possible impacts on the environment. Although no particular restrictions are imposed on water, distilled water, ion-exchange water, tap water, ground water, industrial water or the like can be given.

The viscosity of the paste-like product, i.e. the concentration of solid matters in the solvent, is appropriately determined taking into consideration the purpose of use or the workability. For example, the content of the solvent is preferably 20 to 800 mass %, more preferably 30 to 500 mass %, and further preferably 40 to 300 mass %, relative to 100 mass % of the solid matters of the inorganic fibrous unshaped refractory composition of the invention. If the content of the above-mentioned solvent is less than 20 mass %, ease in applying becomes poor since the fluidity of the inorganic fibrous unshaped refractory composition is deteriorated. In addition, the mechanical strength, the bending strength, in particular, of the resulting applied substance is lowered. Further, if the content of the solvent exceeds 800 mass %, the consistency of the inorganic fibrous unshaped refractory composition is increased, and as result, the paste-like composition falls in drops during application. Further, a resulting applied substance, for example a substance applied in joint undergoes significant shrinkage by drying.

The inorganic fibrous unshaped refractory composition of the invention is, for example, used in spaces (joint) between the refractory shaped articles which are used as a lining material of a member which is in contact with a molten material such as a drainpipe, a molten material holding furnace and a ladle in a non-ferrous metal casting apparatus. By drying or firing, it can become a substance having an arbitral shape. Except that the substance can take an arbitral shape by applying the unshaped refractory composition, the composition or the physical properties of the constituting materials thereof are the same as those of the refractory shaped article of the invention. A metal oxide film can be smoothly formed on the surface of the substance, which fills in narrow spaces between articles (joint), for example.

The inorganic fibrous unshaped refractory composition of the invention can be preferably used as a joint for a lining material of a member which is in contact with a molten material such as a drainpipe, a molten material holding furnace and a ladle in a casting apparatus of a non-ferrous metal such as aluminum and magnesium, for example.

Next, the method for producing the inorganic fibrous unshaped refractory composition of the invention will be explained.

As the method for producing the unshaped refractory composition of the invention, a method in which constituting materials such as the bio-soluble inorganic fibers having a dissolution ratio in a physiological saline at 40° C. of 1 mass %, the inorganic powder having a needle-like crystal structure and the binder as mentioned above are mixed with a liquid solvent can be given.

The amount of the constituting materials of the inorganic fibrous unshaped refractory composition of the invention or the solvent is as mentioned above.

A preferable method for producing the inorganic fibrous unshaped refractory composition of the invention is a method in which the bio-soluble inorganic fibers, the inorganic powder having a needle-like crystal structure and the binder are added to a liquid solvent, further adding other components such as a thickener and an antiseptic, if desired.

As the method for mixing the above-mentioned constituting materials and the solvent, kneading by means of a kneading apparatus such as a kneader and a pressure kneader can be given. The kneading time is preferably 0.1 to 1.0 hour, and the kneading temperature is preferably 5 to 40° C.

The inorganic fibrous unshaped refractory composition of the invention can allow the resulting applied substance (refractory substance) to exhibit desired heat resistance without containing ceramic fibers such as alumina silicate fibers, alumina powder or silica powder, and, at the same time, the production cost and the product price can be reduced.

The invention will be described in more detail with reference to the following examples, which should not be construed as limiting the scope of the invention.

EXAMPLE 1

1. Slurry-Forming Step

As shown in Table 1, to 100 parts by mass of a raw material comprising 81 mass % of bio-soluble inorganic fibers ("Fine Flex-E" manufactured by Nichias Corporation; dissolution ratio in a physiological solution at 40° C. of 1 mass % or more), 9 mass % of wollastonite ("NYAD G" manufactured by Hayashi Kasei Co., Ltd., average length: 660 μm, average diameter: 40 μm, aspect ratio: 16.5), 5 mass % in terms of silica of colloidal silica ("ST-30" manufactured by Nissan Chemical Industries, Inc.), 4.5 mass % of starch and 0.5 mass % of a coagulant ("Polystron 117", manufactured by Arakawa Chemical Industries, Co., Ltd.), 5000 parts by mass of water was added, followed by stirring to form a slurry.

2. Shaping Step

In a shaping die in which a net was provided at the bottom thereof, the above-mentioned slurry was poured. Dehydration shaping was conducted by absorbing water in the slurry, whereby a dehydrated shaped article in the form of a block was obtained.

Subsequently, in the atmosphere, the shaped product was dried at 105° C. for 24 hours, and as a result, a block-shaped dried product (inorganic fibrous shaped refractory article) having a height of 900 cm, a width of 600 cm and a height of 5 cm was obtained.

The above-mentioned inorganic fibrous shaped refractory article was produced in plural numbers. In the atmosphere of air, the shrinkage in the longitudinal direction of each article when fired at 800° C. for 24 hours and the shrinkage in the longitudinal direction of each article when fired at 1100° C. for 24 hours were determined. The measurement results of the shrinkage in the longitudinal direction are shown in Table 1, together with the composition of the inorganic fibrous shaped refractory article.

EXAMPLES 2 to 5 and COMPARATIVE EXAMPLE 1

Inorganic fibrous shaped refractory articles were fabricated in the same manner as in Example 1, except that the composition of a refractory shaped article to be obtained was changed to as shown in Table 1. The shrinkage in the longitudinal direction of each of the resulting shaped articles was determined in the same manner as in Example 1.

As for the inorganic fibrous shaped refractory article obtained in Example 3 and Comparative Example 1, the shrinkage in the longitudinal direction when fired at 1200° C. for 24 hours was also determined.

The measurement results of the shrinkage in the longitudinal direction are shown in Table 1, together with the composition of the inorganic fibrous shaped refractory article.

TABLE 1

| | | Example 1 | Example 2 | Example 3 | Example 4 | Example 5 | Com. Ex. 1 |
|---|---|---|---|---|---|---|---|
| Composition (mass %) | Bio-soluble inorganic fibers | 81 | 72 | 63 | 45 | 36 | 90 |
| | Wollastonite | 9 | 18 | 27 | 45 | 54 | — |
| | Colloidal silica | 5 | 5 | 5 | 5 | 5 | 5 |
| | Starch | 4.5 | 4.5 | 4.5 | 4.5 | 4.5 | 4.5 |
| | Coagulant | 0.5 | 0.5 | 0.5 | 0.5 | 0.5 | 0.5 |
| Shirinkage in the longitudinal direction | 800° C. × 24 hr | 0.36 | 0.19 | 0.11 | 0.21 | 0.00 | 0.53 |
| | 1100° C. × 24 hr | 1.68 | 0.90 | 0.69 | 0.40 | 0.40 | 2.71 |
| | 1200° C. × 24 hr | — | — | 0.81 | — | — | 3.42 |

From the results shown in Table 1, the inorganic shaped refractory articles obtained in Examples 1 to 5 had a shrinkage in the longitudinal direction of 0 to 0.36% when fired at 800° C. for 24 hours and a shrinkage in the longitudinal direction of 0.40 to 1.68% when fired at 1100° C. for 24 hours. Further, the inorganic fibrous shaped refractory article obtained in Example 3 had a shrinkage in the longitudinal direction when fired at 1200° C. for 24 hours of 0.81%.

On the other hand, the inorganic fibrous shaped refractory article obtained in Comparative Example 1 had a shrinkage in the longitudinal direction of 0.53% when fired at 800° C. for 24 hours, a shrinkage in the longitudinal direction of 2.71% when fired at 1100° C. for 24 hours and a shrinkage in the longitudinal direction of 3.42% when fired at 1200° C. for 24 hours.

From the results, it can be understood that, since the inorganic fibrous shaped refractory articles obtained in Examples 1 to 5 contain specific amounts of bio-soluble inorganic fibers and wollastonite, they are capable of exhibiting excellent heat resistance.

Further, it can be understood that, since the inorganic fibrous shaped refractory articles obtained in Examples 1 to 5 are capable of exhibiting excellent heat resistance without containing expensive, alumina powder and silica powder, the production cost and the product price can be reduced.

Also, it can be understood that, since the inorganic fibrous shaped refractory article obtained in Examples 1 to 5 contain bio-soluble inorganic fibers and wollastonite powder that is bio-soluble, they have excellent bio-solubility.

INDUSTRIAL APPLICABILITY

According to the invention, it is possible to provide a highly bio-soluble inorganic fibrous refractory shaped article which can exhibit desired heat resistance without containing alumina powder and silica powder and can be provided at a low cost and at a low price. Further, according to the invention, it is possible to provide a method for producing the above-mentioned inorganic fibrous refractory shaped article easily. Further, according to the invention, it is possible to provide an inorganic fibrous unshaped refractory composition at a low production cost and with a low product price.

The invention claimed is:

1. An inorganic fibrous shaped refractory article comprising
   27 to 63 mass % of bio-soluble inorganic fibers having a dissolution ratio in a physiological saline at 40° C. of 1 mass % or more, the bio-soluble inorganic fibers being alkaline-earth metal silicate fibers comprising:
      20 to 40 wt % of total of CaO and MgO, and
      60 to 80 wt % of $SiO_2$;
   27 to 63 mass % of at least one inorganic powder having a needle-like crystal structure and selected from wollastonite powder, sepiolite powder, and attapulgite powder, and
   3 to 18 mass % of a binder,
   wherein the article comprises the bio-soluble inorganic fibers, the inorganic powder having a needle-like crystal structure and the binder in a total amount of at least 90 mass %.

2. The inorganic fibrous shaped refractory article according to claim 1, wherein the inorganic powder having a needle-like crystal structure has an average length of 1 to 3000 μm and an aspect ratio of 2 to 1000.

3. The inorganic fibrous shaped refractory article according to claim 1, wherein the inorganic powder having a needle-like crystal structure is one or more selected from sepiolite powder and attapulgite powder.

4. The inorganic fibrous shaped refractory article according to claim 1, which comprises 45 to 63 mass % of the bio-soluble inorganic fibers and 27 to 45 mass % of the needle-like crystal structure.

5. A method for producing an inorganic fibrous shaped refractory article, the method comprising subjecting a slurry to dehydration shaping;
   the slurry comprising 27 to 63 mass % of bio-soluble inorganic fibers having a dissolution ratio in a physiological saline at 40° C. of 1 mass % or more, the bio-soluble inorganic fibers being alkaline-earth metal silicate fibers comprising:
      20 to 40 wt % of total of CaO and MgO, and
      60 to 80 wt % of $SiO_2$;
   27 to 63 mass % of at least one inorganic powder having a needle-like crystal structure and selected from wollastonite powder, sepiolite powder, and attapulgite powder, and
   3 to 18 mass % of a binder, in terms of solid matters,
   wherein the slurry comprises the bio-soluble inorganic fibers, the inorganic powder having a needle-like crystal structure and the binder in a total amount of at least 90 mass % in terms of solid matters.

6. The method for producing an inorganic fibrous shaped refractory article according to claim 5, wherein the inorganic powder having needle-like crystal structure is one or more selected from sepiolite powder and attapulgite powder.

7. The method for producing an inorganic fibrous shaped refractory article according to claim 5, wherein the slurry comprises 45 to 63 mass % of the bio-soluble inorganic fibers and 27 to 45 mass % of the needle-like crystal structure.

8. An inorganic fibrous unshaped refractory composition comprising:
   27 to 63 mass % of bio-soluble inorganic fibers having a dissolution ratio in a physiological saline at 40° C. of 1 mass % or more, the bio-soluble inorganic fibers being alkaline-earth metal silicate fibers comprising:
      20 to 40 wt % of total of CaO and MgO and
      60 to 80 wt % of $SiO_2$;
   27 to 63 mass % of at least one inorganic powder having a needle-like crystal structure and selected from wollastonite powder, sepiolite powder, and attapulgite powder, and
   3 to 18 mass % of a binder, in terms of solid matters,
   wherein the composition comprises the bio-soluble inorganic fibers, the inorganic powder having a needle-like crystal structure and the binder in a total amount of at least 90 mass % in terms of solid matters.

9. The inorganic fibrous unshaped refractory composition according to claim 8, wherein the inorganic powder having a needle-like crystal structure is one or more selected from sepiolite powder and attapulgite powder.

10. The inorganic fibrous unshaped refractory composition according to claim 8, which comprises 45 to 63 mass % of the bio-soluble inorganic fibers and 27 to 45 mass % of the needle-like crystal structure.

* * * * *